United States Patent [19]

Freddi et al.

[11] Patent Number: 5,223,073
[45] Date of Patent: Jun. 29, 1993

[54] APPARATUS FOR FORMING CELLS IN CONTINUOUS STRIPS, PARTICULARLY FOR PACKAGING SUPPOSITORIES AND THE LIKE

[75] Inventors: Antonio Freddi, Reggiolo; Primo Finetti, Mirandola, both of Italy

[73] Assignee: Sarong S.p.A., Reggiolo, Italy

[21] Appl. No.: 763,731

[22] Filed: Sep. 23, 1991

[30] Foreign Application Priority Data

Oct. 2, 1990 [IT] Italy .................. 21619 A/90

[51] Int. Cl.⁵ .......................................... B32B 31/04
[52] U.S. Cl. ................... 156/381; 156/145; 156/146; 156/292; 156/500; 264/520; 264/521; 264/522; 264/524; 264/527; 264/530; 264/572; 264/573; 425/503; 425/515; 425/522; 425/535; 425/536; 425/538
[58] Field of Search ........... 156/145, 146, 285, 381, 156/500, 292; 425/503, 515, 519, 110, 112, 116, 121, 122, 233, 522, 535, 536, 538; 53/403, 450, 451, 453, 454, 455, 452; 264/512, 520, 521, 522, 524, 527, 530, 545, 548, 572, 573

[56] References Cited

U.S. PATENT DOCUMENTS

| | | | |
|---|---|---|---|
| 2,918,698 | 12/1959 | Hagen et al. | 264/527 |
| 2,975,473 | 3/1961 | Hagen et al. | 264/527 |
| 2,991,500 | 7/1961 | Hagen | 264/545 |
| 3,114,172 | 12/1963 | Coste | 156/292 |
| 3,782,066 | 1/1974 | Schmitt | 53/453 |
| 3,865,667 | 2/1975 | Ferrari | 156/292 |

FOREIGN PATENT DOCUMENTS 3141069 10/1981 Fed. Rep. of Germany .
1199371 2/1958 France .
2201958 10/1972 France .

Primary Examiner—Caleb Weston
Attorney, Agent, or Firm—Guido Modiano; Albert Josif

[57] ABSTRACT

The apparatus includes advancement clamps which move two mutually facing films along an advancement direction on which the following are arranged in sequence: two welding half-molds, which by mutually welding the two films in preset regions define cells which are open toward a longitudinal edge of the films; two half-molds for heating the welded films; a cell forming station. Air injection nozzles, inserted between the two flaps of the films on the side of the above mentioned longitudinal edge, and two forming half-molds, in which forming cavities are defined at the cells, operate in the forming station. Divaricators for divaricating the two flaps of the films are provided proximate to the forming station so as to facilitate the insertion of the air injection nozzles.

13 Claims, 2 Drawing Sheets

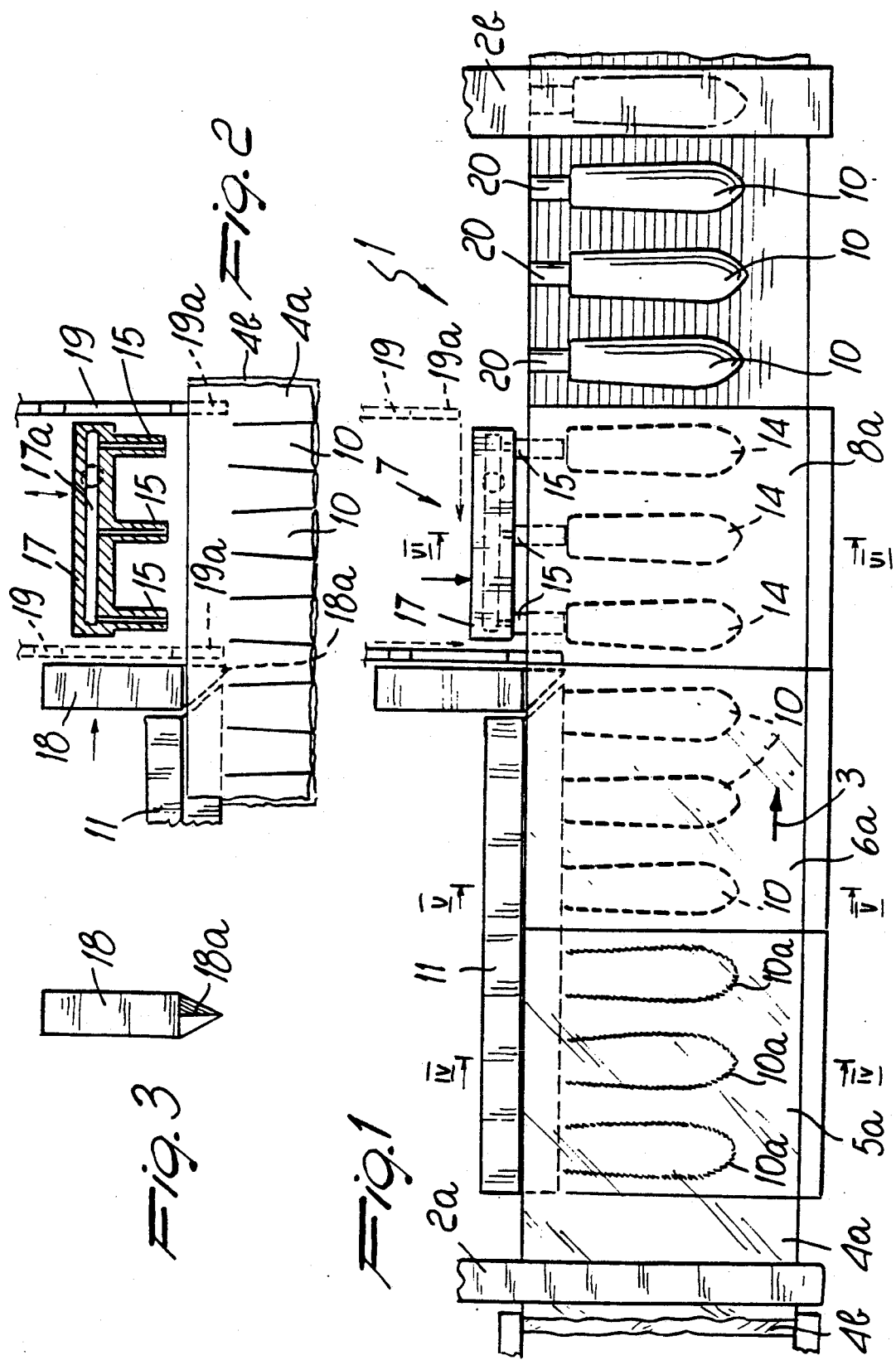

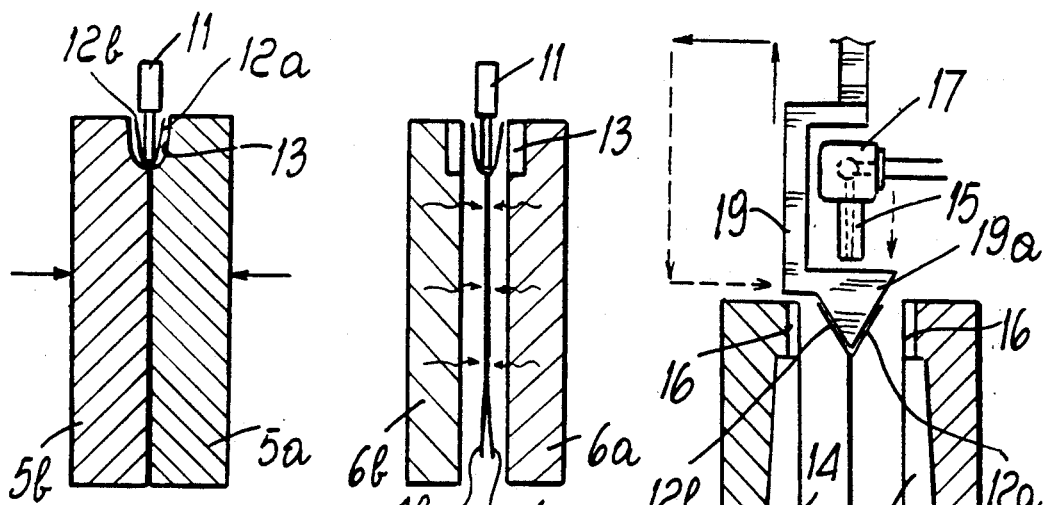
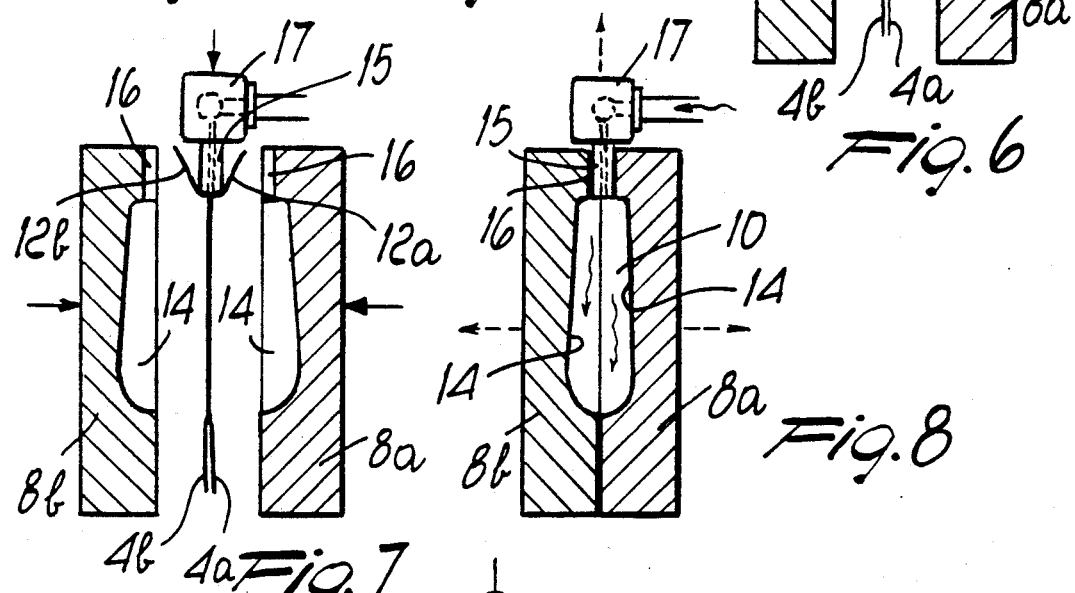
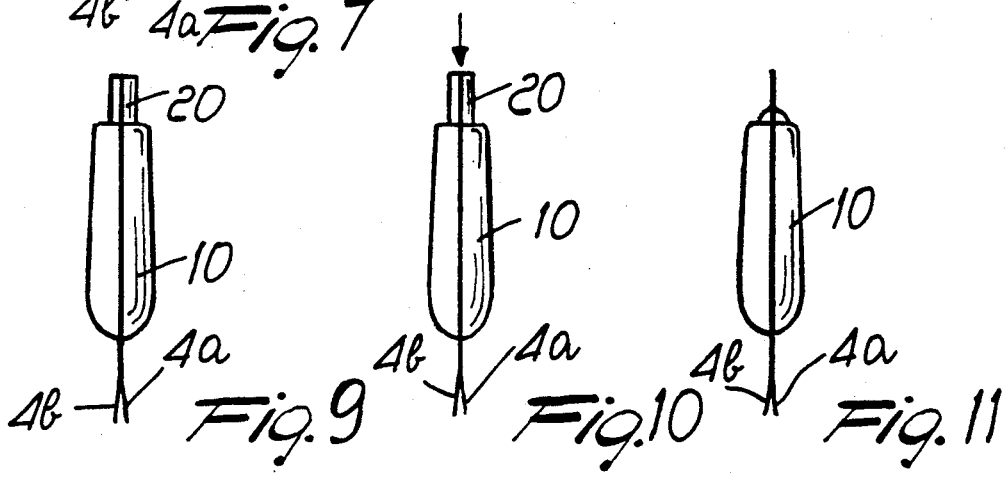

APPARATUS FOR FORMING CELLS IN CONTINUOUS STRIPS, PARTICULARLY FOR PACKAGING SUPPOSITORIES AND THE LIKE

BACKGROUND OF THE INVENTION

The present invention relates to an apparatus for forming cells in continuous strips, particularly for packaging suppositories and the like.

As is known, products such as suppositories, pessaries and the like are currently packaged by using two films made of thermoformable synthetic material which are coupled and in which containment cells, which reproduce the shape of the suppositories or pessaries, are defined. The cells initially have an open neck inside which the substance which composes the suppositories or pessaries is injected; said substance, by hardening, assumes the shape of the cells. The neck for the insertion of the substance is sealed after filling.

The methods currently used to manufacture said containers entail the coupling of two films made of synthetic material, welding them in preset regions so as to define mutually spaced cells along the extension of the films. Usually, on films which extend in a continuous strip, cells which are opposite with respect to a longitudinal median region of the films, which is not affected by the welding and is transversely connected to the cells, are defined. The films are then heated and inserted in forming molds in which forming cavities are defined; said forming cavities have a shape which corresponds to the final shape of the cells to be obtained. Pressurized air is injected through the central region and reaches the cells, defined by means of the previously executed welding, causing their expansion and adhesion to the forming cavities.

The strip which is obtained at the end of the forming thus has two rows of opposite cells and an expanded longitudinal median region which is connected, by means of ducts or necks, to the various cells.

Depending on whether the filling machines for which said strips are intended require or not a certain rigidity of the strips, the strip with double row of cells is cut at its median line so as to obtain two strips in each of which half of said expanded region is present, or said expanded median region is removed completely so that the strip can be o coiled in rolls.

If the expanded median region is not discarded, each of the two strips obtained has, at a longitudinal edge, flaps which increase the flexural rigidity of the strip in its passage through the filling machines. After filling, the ducts for access to the cells are sealed and the flaps are removed by cutting.

In both of the above described processes there is a considerable waste of material which affects the manufacturing costs of said types of container.

In order to solve this problem, an apparatus, disclosed in the U.S. Pat. No. 1,197,898 in the name of the same Applicant, has been provided which permits to eliminate said waste of material, allowing to produce strips arising from the coupling of two synthetic films with cells and without flaps. Although said apparatus has a modest bulk and high reliability, it has the disadvantage that it is complicated to manufacture, with unavoidably high production costs.

SUMMARY OF THE INVENTION

The aim of the present invention is to solve the above described problems by providing an apparatus which, although it allows to eliminate the waste of material in the execution of strips with cells for the packaging of suppositories, pessaries or the like, is simple to manufacture and has modest production costs.

Within the scope of this aim, an object of the invention is to provide an apparatus which is highly reliable and precise in operation.

This aim, these objects and others which will become apparent hereinafter are achieved by an apparatus for forming cells in continuous strips, in particular for the packaging of injectable products such as suppositories, pessaries or the like, characterized in that it comprises: means for the advancement of two films made of thermoformable material which face one another along a advancement direction; two welding half-molds facing, on opposite sides, the advancement path of said two films can be controllably moved closer so as to define in said films, by welding, cells which are open proximate to one of their ends which is directed toward a longitudinal edge of said films; two half-molds for heating the films, arranged after said welding half-molds along the direction of advancement of said films; a forming station which is arranged after said heating half-molds and comprises nozzles for injecting pressurized air which can be inserted between the flaps of said two films on the side of said longitudinal edge at said cells and two forming half-molds in which forming cavities are defined at said cells, said forming half-molds being movable toward one another on opposite sides with respect to the plane of arrangement of said films; means for divaricating said flaps of the two films being provided at least at said forming station so as to facilitate the insertion of said air injection nozzles.

BRIEF DESCRIPTION OF THE DRAWINGS

Further characteristics and advantages of the invention will become apparent from the description of a preferred but not exclusive embodiment of the apparatus according to the invention, illustrated only by way of non-limitative example in the accompanying drawings, wherein:

FIG. 1 is a schematic lateral elevation view of the apparatus according to the invention;

FIG. 2 is a partially sectional view of a detail of FIG. 1, in which the forming half-molds are removed for the sake of simplicity;

FIG. 3 is a front elevation view of one of the divarication means according to the invention;

FIG. 4 is a schematic sectional view of FIG. 1, taken along the axis IV—IV;

FIG. 5 is a schematic sectional view of FIG. 1, taken along the axis V—V;

FIGS. 6 to 8 are schematic sectional views of FIG. 1, taken along the axis VI—VI, which clearly show the closure of the forming half-molds;

FIGS. 9 to 11 are front views of the strip container obtained by means of the apparatus according to the invention during the filling and sealing steps.

DESCRIPTION OF THE PREFERRED EMBODIMENTS

With reference to the above figures, the apparatus according to the invention, generally indicated by the reference numeral 1, comprises means 2a and 2b for the advancement, along a direction 3, of two films 4a and 4b made of thermoformable synthetic material which are arranged in a plane of arrangement and face one another with one of their faces. The following are arranged in sequence along the advancement path of the films: two welding half-molds 5a and 5b, two heating half-molds 6a and 6b, and a forming station 7 in which two forming half-molds 8a and 8b are arranged.

The advancement means 2a and 2b are constituted by two clamps; one is arranged ahead of the welding half-molds 5a and 5b and the other one is arranged after the forming station 7. Said clamps can controllably engage and disengage the films 4a and 4b and are actuated with a reciprocating motion, in a per se known manner, parallel to the direction 3 so as to cause the intermittent advancement of the films 4a and 4b along the direction 3.

At least one recess is defined, at the cells 10, on the grip surface of the clamp 2b, which is intended to engage the films after forming, so as to not damage said cells.

The two welding half-molds 5a and 5b face one another on opposite sides with respect to the advancement path of the films 4i a and 4b and are provided, in a known manner, with heating means for mutually welding the two films along preset lines 10a so as to define uniformly mutually spaced cells 10 which are open toward a longitudinal edge of the films (the upper edge in the figures).

The two heating half-molds 6a and 6b also face one another on opposite sides with respect to the two films 4a and 4b and heat the films to such a temperature as to allow the plastic deformation of the cells 10 in the subsequent forming station 7.

Conveniently, at the welding half-molds 5a and 5b and at the heating half-molds 6a and 6b, there is an auxiliary fixed divaricator 11 which is intended to engage between the two flaps 12a and 12b at the longitudinal edge of the two films toward which the openings of the cells are orientated. Said divaricator 11 has a blade configuration and is made of anti-stick material in order to avoid the adhesion of the flaps 12a and 12b during welding and heating.

A recess 13 is defined in the welding half-molds 5a and 5b and in the heating half-molds 6a and 6b, at the divaricator 11, for accommodating the part of the divaricator 11 which extends inside said half-molds.

The two forming half-molds 8a and 8b face one another laterally on opposite sides with respect to the plane of arrangement of the films 4a and 4b, and forming cavities 14, having the shape of the cells to be obtained, are defined on the faces which are directed toward the film.

Air injection nozzles 15 are provided in the forming station 7, are arranged substantially in the same plane of arrangement as the films 4a and 4b and are spaced with a pitch which corresponds to the pitch of the cells 10 so that each nozzle is at a forming cavity 14.

Said air injection nozzles 15 face the side of the forming half-molds 8a and 8b which embraces the flaps 12a and 12b of the films, and adapted seats 16 are defined at said side in the forming half-molds 8a and 8b and are intended to accommodate said nozzles, which are inserted between the flaps 12a and 12b of the films.

The air injection nozzles 15 have a cylindrical configuration and are orientated perpendicular to the direction 3. Said nozzles are fixed to a supporting body 17 which is controllably movable perpendicular to the direction of advancement so as to cause the insertion or extraction of the nozzles in or from the flaps 12a and 12b of the films. A channel 17a is defined in the supporting body 17, can be connected to a source of compressed air and feeds the nozzles 15.

Proximate to the forming station 7 there are divarication means which keep the two flaps 12a and 12b spaced from one another so as to facilitate the insertion of the nozzles 15.

Said divarication means comprise a first fixed divaricator 18, which is arranged directly ahead of the forming half-molds 8a and 8b and has a wedge-shaped end 18a which is inserted between the flaps 12a and 12b of the films directly ahead of the forming half-molds.

The divarication means also comprise a second divaricator 19, which is controllably movable parallel to the direction 3 along the entire extension of the forming half-molds starting from the first divaricator 18 and vice versa. The second divaricator 19 is furthermore movable toward or away from the forming half-molds for the insertion or extraction of its wedge-shaped end 19a between or from the flaps 12a and 12b.

The movement of the welding half-molds, of the heating half-molds and of the forming half-molds can be provided, in a per se known manner, by slidingly mounting the various half-molds on guiding bars which extend transversely to the plane of arrangement of the films during the advancement thereof.

The operation of the apparatus according to the invention is as follows.

The two films 4a and 4b are conveyed along the advancement direction 3 so that a segment of the films, equal in length to the capacity of the various half-molds, is in each instance located between the two welding half-molds 5a and 5b. Half-molds 5a,5b are moved mutually closer so as to weld the two films 4a and 4b along lines which define cells 10 which are open in the direction of the flaps 12a and 12b. Flaps 12a, 12b are kept mutually spaced by the fixed divaricator 11.

The two welding half-molds 5a and 5b are subsequently opened and the films are caused to advance along the direction 3 until the welded part is moved between the heating half-molds 6a and 6b. The two flaps 12a and 12b are kept separated by means of the divaricator 11 during heating as well.

Once heating is over, the segment of film is caused to advance between the two forming half-molds 8a and 8b. During this advancement, the flaps 12a and 12b slide against the first fixed divaricator 18, which spaces the two flaps 12a and 12b from one another. Simultaneously, the second divaricator 19 is moved away from the first divaricator 18. When the segment of coupled films is arranged correctly with respect to the forming half-molds 8a and 8b, the flaps 12a and 12b are kept spaced from one another by the presence of the fixed divaricator 18 and of the movable divaricator 19, which has moved after the forming half-molds.

In these conditions, the air injection nozzles 15 are inserted between the flaps 12a and 12b and the two forming half-molds 8a and 8b are closed. The closure of the half-molds 8a and 8b produces a tight seal between the nozzles, the films and the half-molds, and compressed air is injected through the nozzles 15 into the cells, which deform in a plastic manner and adhere to the walls of the forming cavities 14 and thus assume their final shape.

Once forming has occurred, the two half-molds 8a and 8b are opened and the nozzles are extracted from the flaps 12a and 12b, in which the presence of the nozzles has produced substantially cylindrical feed ducts 20, each of which leads into a cell 10.

The movable divaricator 19 is then returned toward the fixed divaricator 18 and is ready to receive the arrival of another film segment which has meanwhile passed through the welding half-molds add the heating half-molds.

The cycle then continues as already described.

The cells 10 are filled by injecting the substance through the feed duct 20, which is then closed by heat-welding (FIGS. 9, 10, 11).

The strip container for suppositories, pessaries or the like is thus ready for marketing without requiring further trimming operations and thus without entailing wastes of material.

In practice it has been observed that the apparatus according to the invention fully achieves the intended aim, since, although it has a structure which is simple to manufacture, it avoids wastes of material in the execution of strip containers for suppositories, pessaries or the like.

The apparatus thus conceived is susceptible to numerous modifications and variations, all of which are within the scope of the inventive concept; thus, for example, the number of the forming cavities or the number of the cells defined by welding can be any according to the requirements. All the details may furthermore be replaced with technically equivalent elements.

In practice, the materials employed, as well as the dimensions, may be any according to the requirements and to the state of the art.

We claim:

1. In combination, an apparatus for forming cells in continuous strips for packaging suppositories, and two films made of thermoformable material said two films facing one another and defining flaps, said apparatus comprising: means for the advancement of said two films along an advancement direction; two welding half-molds facing, on opposite sides, the advancement path of said two films can be controllably moved closer so as to define in said films, by welding, cells which are open proximate to one of their ends which is directed toward a longitudinal edge of said films; two half-molds for heating the films, arranged after said welding half-molds along the direction of advancement of said films; a forming station which is arranged after said heating half-molds and comprises nozzles for injecting pressurized air which can be inserted between said flaps of said two films on the side of said longitudinal edge at said cells and two forming half-molds in which forming cavities are defined at said cells, said forming half-molds being movable toward one another on opposite sides with respect to the plane of arrangement of said films; means for divaricating said flaps of said two films being provided at least at said forming station so as to facilitate the insertion of said air injection nozzles.

2. Combination according to claim 1, wherein said advancement means comprise at least one first clamp arranged ahead of said welding half-molds and at least one second clamp arranged after said forming half-molds, said clamps being controllably engageable with, and disengageable from, said films and being controllably movable along said advancement direction for an intermittent advancement of said films.

3. Combination according to claim 2, wherein said second clamp has, on its film grip surface, recesses at said cells.

4. Combination according to claim 3, wherein said divarication means comprise a first fixed divaricator which is arranged proximate to the inlet of said forming station.

5. Combination according to claim 4, wherein said divarication means comprise a second divaricator which can move parallel to said advancement direction along said forming station starting from said first divaricator substantially along the entire extension of said forming half-molds and vice versa.

6. Combination according to claim 5, wherein said films define two flaps, and wherein said first divaricator and said second divaricator have a wedge-shaped end which can be inserted between said two flaps of said films.

7. Combination according to claim 6, wherein said air injection nozzles are mutually spaced by a pitch which corresponds to the pitch of said cells parallel to said advancement direction.

8. Combination according to claim 7, wherein said films define two flaps, and wherein said air injection nozzles are orientated substantially perpendicular to said advancement direction and are arranged substantially in the plane of arrangement of said two films at said forming station, said air injection nozzles being mounted on a supporting body which is controllably movable perpendicular to said advancement direction for the insertion or extraction of said nozzles in or from said two flaps of the films.

9. Combination according to claim 8, wherein accommodation seats are defined in said forming molds for said nozzles inserted between said two flaps of said films during forming.

10. Combination according to claim 8, wherein accommodation seats are defined in said forming molds for said nozzles inserted between said two flaps of said films during forming, said apparatus further comprising an auxiliary fixed divaricator arranged at said welding half-mold and at said heating half-mold and said films in order to keep them in a mutually spaced position.

11. Combination according to claim 10, wherein said auxiliary fixed divaricator is blade-shaped.

12. Combination according to claim 11, wherein a recess for accommodating said auxiliary fixed divaricator is defined in said welding half-mold and in said heating half-mold.

13. Combination according to claim 12, wherein said air injection nozzles have a substantially cylindrical configuration.

* * * * *